US011949499B2

(12) United States Patent
Li (10) Patent No.: US 11,949,499 B2
(45) Date of Patent: Apr. 2, 2024

(54) METHODS, APPARATUS AND SYSTEMS FOR TIME MAPPING IN A WIRELESS COMMUNICATION (71) Applicant: ZTE CORPORATION, Guangdong (CN)

(72) Inventor: Zhendong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 82 days.

(21) Appl. No.: 17/519,233

(22) Filed: Nov. 4, 2021

(65) Prior Publication Data
US 2022/0239398 A1 Jul. 28, 2022

Related U.S. Application Data (63) Continuation of application No. PCT/CN2019/085803, filed on May 7, 2019.

(51) Int. Cl.
H04J 3/06 (2006.01)
H04W 56/00 (2009.01)

(52) U.S. Cl.
CPC .......... *H04J 3/0644* (2013.01); *H04J 3/0667* (2013.01); *H04W 56/001* (2013.01)

(58) Field of Classification Search
CPC .......... H04J 3/0644; H04J 3/0667; H04J 3/14; H04W 56/001; H04W 56/0015; H04W 28/24; H04W 92/02
See application file for complete search history.

(56) References Cited

U.S. PATENT DOCUMENTS

| 2020/0228220 | A1* | 7/2020 | Joseph | H04J 3/0697 |
| 2020/0259896 | A1* | 8/2020 | Sachs | H04J 3/0667 |
| 2020/0267622 | A1* | 8/2020 | Joseph | H04L 45/26 |
| 2020/0267673 | A1* | 8/2020 | Joseph | H04L 69/28 |
| 2020/0329441 | A1* | 10/2020 | Ha | H04J 3/067 |
| 2020/0351804 | A1* | 11/2020 | Moon | H04W 76/25 |
| 2021/0144666 | A1* | 5/2021 | Sivasiva Ganesan | H04W 56/0015 |
| 2021/0219357 | A1* | 7/2021 | Talebi Fard | H04L 47/724 |
| 2021/0367742 | A1* | 11/2021 | Marco | H04L 5/0078 |
| 2021/0400524 | A1* | 12/2021 | Kahn | H04L 65/80 |
| 2022/0030530 | A1* | 1/2022 | Munz | H04L 12/4625 |

(Continued)

FOREIGN PATENT DOCUMENTS

WO  WO-2013/101391 A1  7/2013
WO  WO-2018200038 A1 * 11/2018
(Continued)

OTHER PUBLICATIONS

Extended European Search Report on EP Application No. 19927858.1; dated Nov. 17, 2022; pp. 8.
(Continued)

*Primary Examiner* — Chi H Pham
*Assistant Examiner* — Vladislav Y Agureyev
(74) *Attorney, Agent, or Firm* — Foley & Lardner LLP (57) ABSTRACT

Methods, apparatus and systems for time mapping in a wireless communication are disclosed. In one embodiment, a method performed by a first network node of a wireless system is disclosed. The method comprises: receiving, from a controller of a time sensitive network (TSN), a configuration that comprises time information for scheduling; and converting the time information to converted time information of the wireless system.

10 Claims, 10 Drawing Sheets

(56) References Cited

U.S. PATENT DOCUMENTS

| | | | |
|---|---|---|---|
| 2022/0030533 A1* | 1/2022 | Munz | H04W 56/005 |
| 2022/0046462 A1* | 2/2022 | De Andrade Jardim | H04L 47/2416 |
| 2022/0078662 A1* | 3/2022 | Wang | H04L 47/20 |
| 2022/0216932 A1* | 7/2022 | Wang | H04J 3/0641 |

FOREIGN PATENT DOCUMENTS

| | | | | |
|---|---|---|---|---|
| WO | WO-2020/151806 A | | 7/2020 | |
| WO | WO-2020150333 A1 | * | 7/2020 | ............ H04L 47/28 |
| WO | WO-2020171802 A1 | * | 8/2020 | ............ H04J 3/0644 |
| WO | WO-2020/199923 A1 | | 10/2020 | |
| WO | WO-2020222197 A1 | * | 11/2020 | ............ H04J 3/0641 |

OTHER PUBLICATIONS

International Search Report and Written Opinion on International Application No. PCT/CN2019/085803, dated Jan. 23, 2020 (7 pages).

Nokia et al., "Clarifications on TSC Assistance Information to SA2", 3GPP TSG-RAN WG2 Meeting #106, R2-1907194, Reno, USA, May 2, 2019 (3 pages).

3GPP, "3rd Generation Partnership Project; Technical Specification Group Services and System Aspects; Study on enhancement of 5GS for Vertical and LAN services (Release 16)", 3GPP TR 23.734 v16.1.0, Mar. 25, 2019 (111 pages).

First Office Action for JP Appl. No. 2021-566290, dated Mar. 7, 2023 (with English translation, 11 pages).

\* cited by examiner

METHODS, APPARATUS AND SYSTEMS FOR TIME MAPPING IN A WIRELESS COMMUNICATION

CROSS-REFERENCE TO RELATED APPLICATION

This application claims the benefit of priority under 35 U.S.C. § 120 as a continuation of PCT Patent Application No. PCT/CN2019/085803, filed on May 7, 2019, the disclosure of which is incorporated herein by reference in its entirety.

TECHNICAL FIELD

The disclosure relates generally to wireless communications and, more particularly, to methods, apparatus and systems for time mapping in a wireless communication.

BACKGROUND

The 4th Generation mobile communication technology (4G) Long-Term Evolution (LTE) or LTE-Advance (LTE-A) and the 5th Generation mobile communication technology (5G) face more and more demands. One of the important goals of the 5G system is to support industrial Internet and vertical industry applications, where a time sensitive network (TSN) can meet the strict requirements of industrial applications for both delay and jitter. A 5G system may support the TSN traffic, when the 5G system is enhanced to serve as a virtual bridge for the TSN network. That is, from the perspective of the TSN network, the 5G system looks like a TSN bridge entity.

Every TSN network has its own time domain. That is, all TSN entities in the TSN network are time synchronized with a TSN master clock. A 5G system also has its own time domain. The 5G system entities, e.g. user equipment (UE), next generation radio access network (NG-RAN) base station, user plane function (UPF), etc. are time synchronized with a 5G master clock. The 5G master clock is different with the TSN master clock. The master clocks in different TSN networks are also different from each other. That is, the reference times of TSN master clocks of two TSN networks are different.

The NG-RAN in the 5G system needs the time information of TSN traffic to make radio resource reservation. When the 5G system supports multiple TSN networks, there is no existing method to handle the control signaling from different TSN networks in different time domains. If all of the 5G entities, especially the NG-RAN, are time synchronized with every TSN master clock, the complexity of the system increases dramatically. For example, when a 5G system supports 6 TSN networks, the NG-RAN must keep time synchronization with 6 master clocks in these TSN networks.

Thus, existing systems and methods for time mapping in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first network node of a wireless system is disclosed. The method comprises: receiving, from a controller of a time sensitive network (TSN), a configuration that comprises time information for scheduling; and converting the time information to converted time information of the wireless system.

In another embodiment, a method performed by a first network node of a wireless system is disclosed. The method comprises: receiving, from a controller of a time sensitive network (TSN), a configuration that comprises time information for scheduling; and transmitting the time information received from the controller to a second network node of the wireless system.

In yet another embodiment, a method performed by a first network node of a wireless system is disclosed. The method comprises: reporting, to a second network node of the wireless system, a time relation between a first master clock of the wireless system and a second master clock of a time sensitive network (TSN).

In a different embodiment, a network node configured to carry out a disclosed method in some embodiment is disclosed. In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS. A 5G BS may be located at the network side that includes various network nodes, e.g. next generation radio access network (NG-RAN) base station, user plane function (UPF), session management function (SMF), access and mobility control function (AMF), policy control function (PCF), application function (AF), etc.

In one embodiment, the AMF is a common control plane function in the 5G core network and is responsible for authentication, authorization, and subscription checking of a user to ensure that the user is a legitimate user. The SMF interacts with a UE and is mainly responsible for processing the protocol data unit (PDU) session establishment, modification, and deletion requests, selecting the UPF, and establishing the user plane connection from the UE to the UPF, and determining the QoS parameters of the session with the PCF. The UPF provides user plane processing functions, including data forwarding and QoS execution. The UPF also provides user plane anchors during a movement of a user to ensure business continuity. The PCF supports a unified policy framework, provides resource authorization, and provides policy rules to the control plane. The AF provides business functions, and can request resource authorization from the PCF.

The present teaching discloses various systems and methods for time mapping between master clocks of a wireless system (e.g. a 5G system) and a TSN network. The wireless system may serve as a virtual element of the TSN network, such that a conversion may be needed from the time information of the TSN network to the time information of the wireless system. In one embodiment, the AF includes a TSN Translator (TT) functionality and is time synchronized with both the TSN master clock and the 5G master clock. As such, when the AF receives, from a centralized network controller (CNC) of the TSN network, a configuration including time information of the TSN, the AF can convert the TSN time information in the configuration to the time information corresponding to the 5G master clock.

In another embodiment, the AF can transmit the TSN time control information as well as a time relation between the 5G master clock and the TSN master clock to PCF. Based on the transmitted information, the PCF then converts the TSN time control information to the 5G time information.

In a different embodiment, the UPF includes the TT functionality and is time synchronized with both the TSN master clock and the 5G master clock. During or after an establishment of a protocol data unit (PDU) session, the UPF can report a time relation between the 5G master clock and the TSN master clock to the 5G core system, e.g. to PCF via SMF. Then after the AF receives the configuration from the CNC, it forwards the TSN time information to PCF. The PCF may convert the TSN time information to the 5G clock time information based on the time relation.

In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

Figure 1:
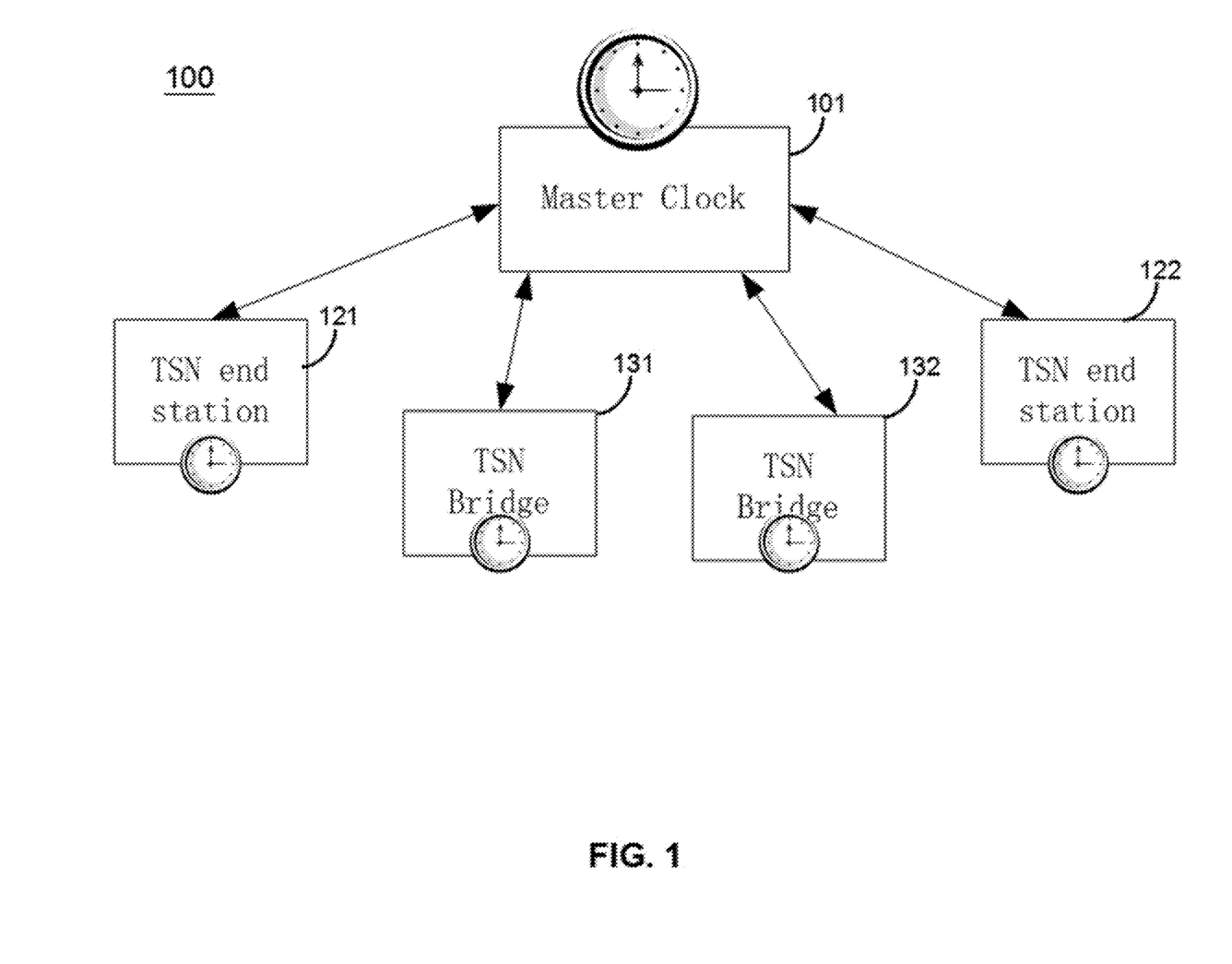
FIG. 1 illustrates an exemplary diagram for time synchronization of a TSN network, in accordance with an embodiment of the present disclosure.

FIG. 1 illustrates an exemplary diagram for time synchronization of a TSN network 100, in accordance with an embodiment of the present disclosure. As shown in FIG. 1, the TSN network 100 includes a master clock 101, one or more TSN end stations 121, 122, and one or more TSN bridges 131, 132. In order to guarantee time sensitivity requirements of the TSN network 100, all network elements need to maintain time synchronization. That is, for all network elements 121, 122, 131, 132, their local times are basically the same, with the error being usually in the level of nanosecond.

In the TSN network 100 shown in FIG. 1, there is a grand master clock 101. All the TSN entities (e.g. TSN end stations 121, 122, TSN bridges 131, 132, etc.) need to be time synchronized with the TSN master clock 101. The clock time synchronization within the TSN network 100 may be performed based on a protocol like IEEE 802.1AS or IEEE 1588. In this way, it can be considered that all TSN network elements in the TSN network 100 are also clock synchronized. This means all the TSN entities within the TSN network 100 has the same clock within a controlled error range. For example, if the master clock time is T1, and the synchronization error is A nanoseconds, then the time T at each of the TSN network elements is between T1−A and T1+A. The clock error between every two TSN network elements is 2 A nanoseconds. When A is small enough, the local time of the two TSN network elements can be considered the same, i.e. the two TSN network elements are time synchronized.

Figure 2:
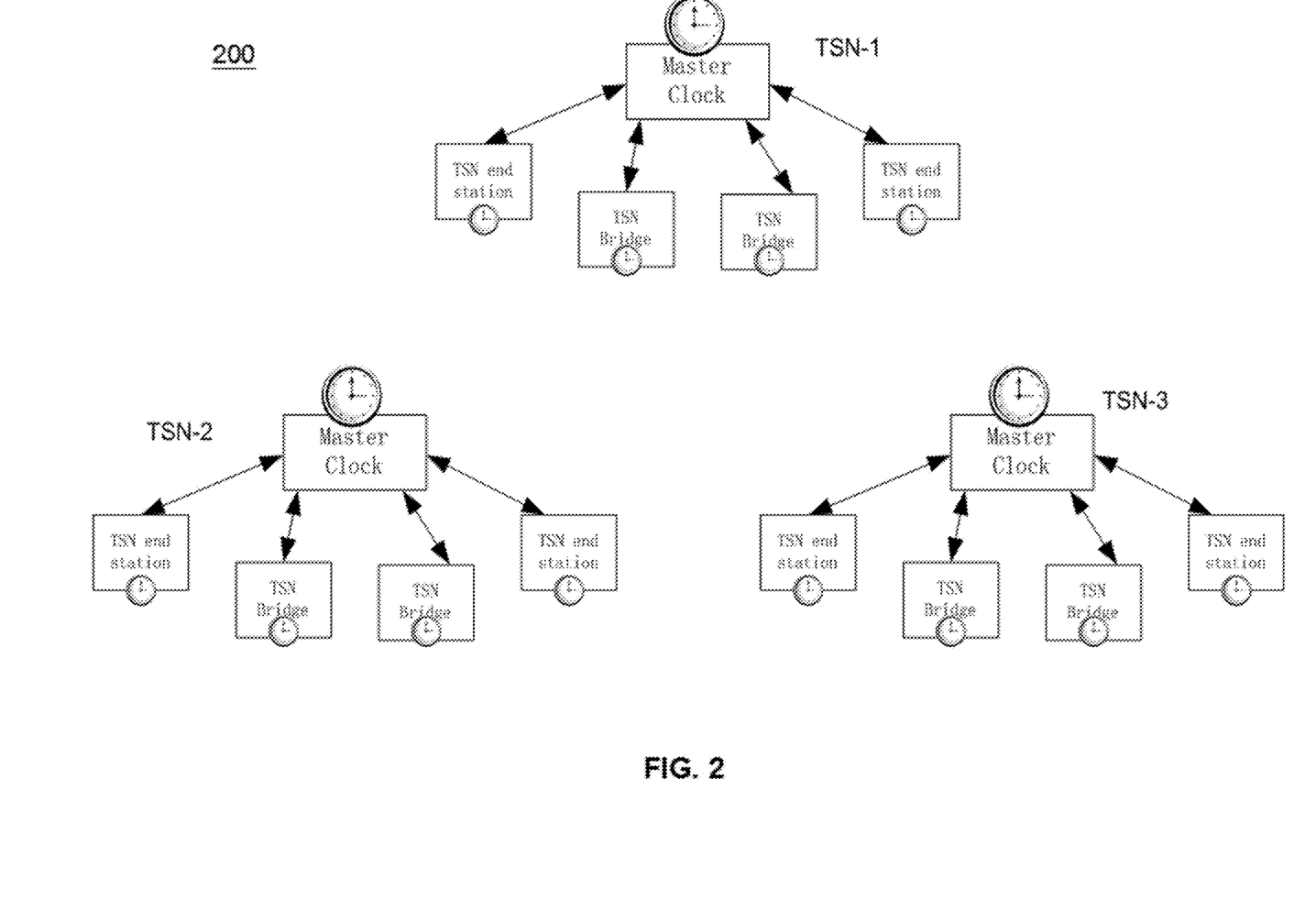
FIG. 2 illustrates an exemplary diagram for time synchronization in a plurality of TSN networks, in accordance with an embodiment of the present disclosure.

FIG. 2 illustrates an exemplary diagram for time synchronization in a plurality of TSN networks 200, in accordance with an embodiment of the present disclosure. These TSN networks 200 all have their own master clocks. Although the TSN entities in each TSN network are time synchronized with their corresponding master clock in the TSN network, these master clocks in different TSN networks are likely to be different without being time synchronized.

Figure 3:
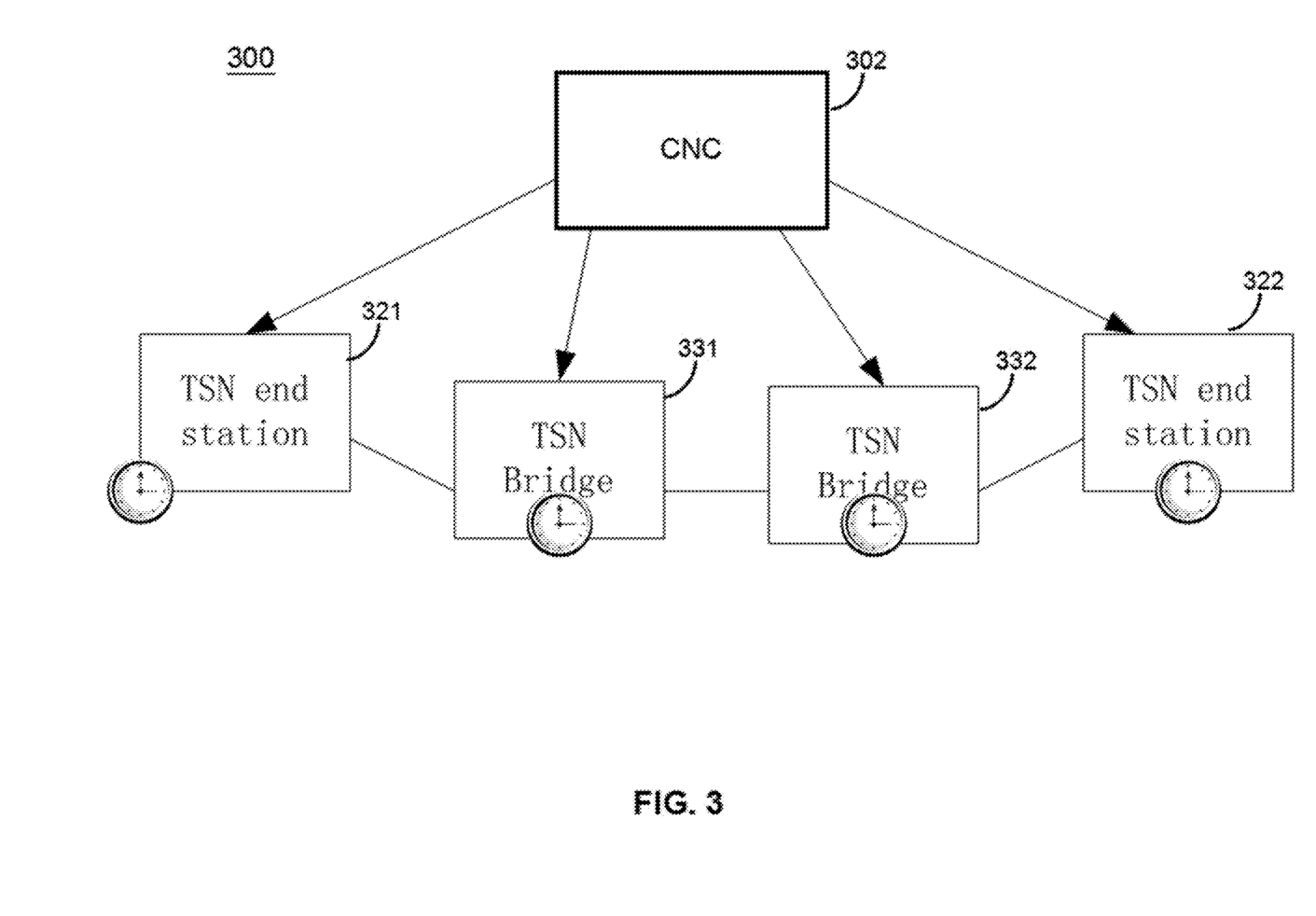
FIG. 3 illustrates an exemplary diagram for configuring schedule information to TSN entities, in accordance with an embodiment of the present disclosure.

FIG. 3 illustrates an exemplary diagram for configuring schedule information to TSN entities in a TSN network 300, in accordance with an embodiment of the present disclosure. As shown in FIG. 3, the TSN network 300 includes a centralized network controller (CNC) 302, one or more TSN end stations 321, 322, and one or more TSN bridges 331, 332. The CNC 302 in the TNS network 300 can control and/or configure each TSN entity with TSN clock information to handle the TSN traffic. For example, the CNC 302 may send the schedule control information to a TSN bridge, where the schedule control information is used to determine: when the gate in the bridge can be opened, how long the gate can be opened, the gate control periodicity, etc. The control information may include a TSN time information regarding a timing point, according to the master clock of the TSN network 300, for each controlled operation.

Figure 4:
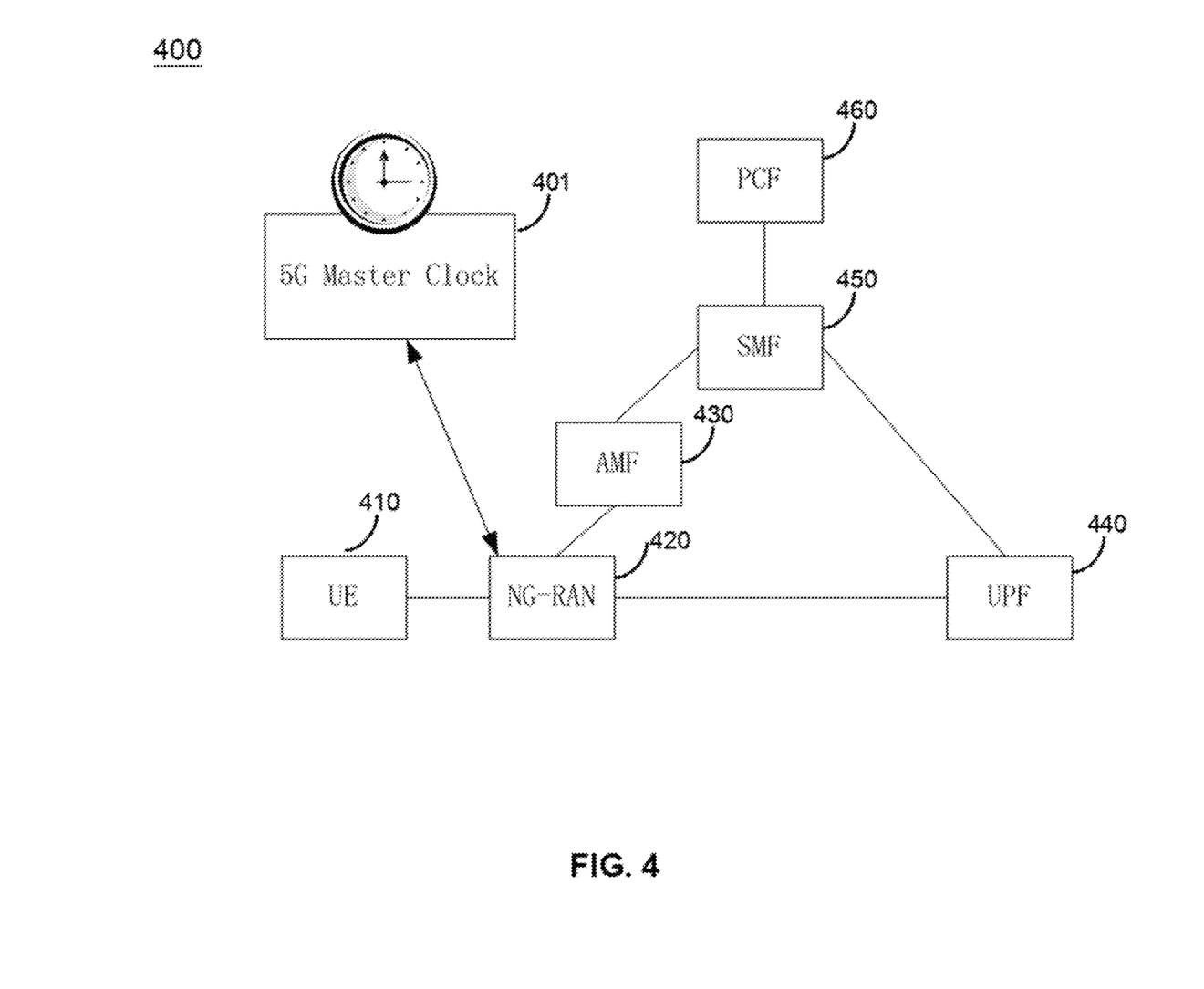
FIG. 4 illustrates an exemplary diagram for time synchronization of a wireless system, in accordance with an embodiment of the present disclosure.

FIG. 4 illustrates an exemplary diagram for time synchronization of a wireless system 400, in accordance with an embodiment of the present disclosure. The wireless system 400 may be a 5G system. As shown in FIG. 4, the 5G system 400 includes a 5G master clock 401, one or more UEs 410, one or more next generation radio access network (NG-RAN) base stations 420, an access and mobility control function (AMF) 430, a user plane function (UPF) 440, a session management function (SMF) 450, and a policy control function (PCF) 460.

There is a clock synchronization inside the 5G system. First, the 5G NG-RAN base stations 420 are all synchronized with the 5G master clock 401. The time synchronization may be based on, e.g. GPS, 802.1AS, and/or IEEE 1588. Each NG-RAN 420 then broadcasts time through e.g. a specific system information block (SIB) to complete time synchronization between the NG-RAN and the UEs associated with the NG-RAN. As such, all the NG-RAN base stations in the 5G system 400 are time-synchronized with each other, since each of them is synchronized with the master clock 401. In addition, the UE and the NG-RAN are also time-synchronized with each other. As such, the UEs can also be time-synchronized to each other.

Figure 5:
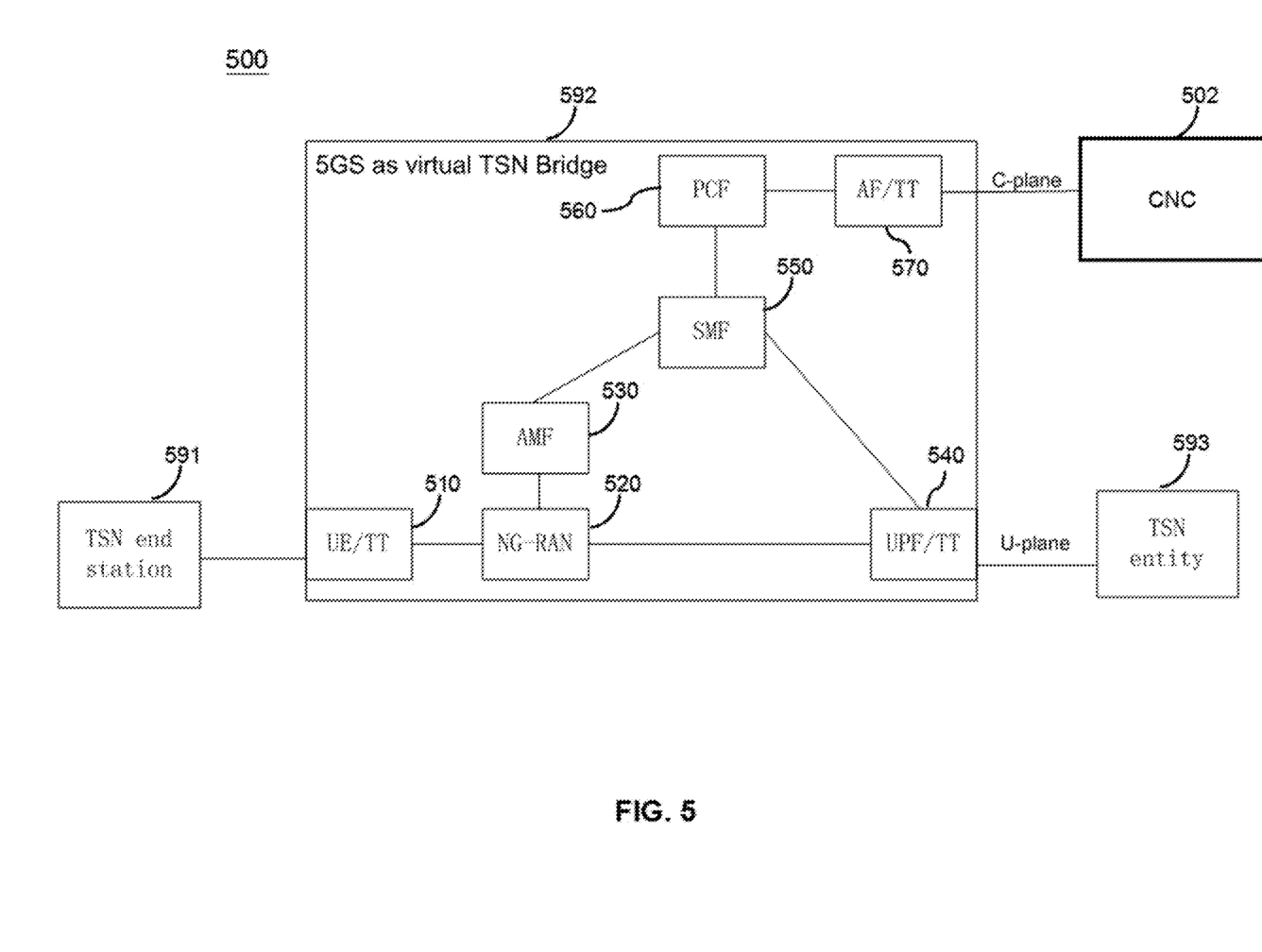
FIG. 5 illustrates an exemplary diagram of a TSN network where a wireless system supports the TSN network as a virtual bridge, in accordance with an embodiment of the present disclosure.

FIG. 5 illustrates an exemplary diagram of a TSN network 500 where a wireless system 592 supports the TSN network 500 as a virtual bridge, in accordance with an embodiment of the present disclosure. As shown in FIG. 5, the TSN network 500 includes TSN end station 591, TSN bridge 592, TSN entity 593, and a CNC 502. In this example, a 5G system 592 can simulate a TSN bridge to the TSN network 500. As shown in FIG. 5, the 5G system 592 includes one or more UEs 510, one or more NG-RAN base stations 520, AMF 530, UPF 540, SMF 550, PCF 560 and AF 570.

The 5G system 592 may be called a virtual or logical TSN bridge. This logical TSN bridge may include TSN Translator (TT) functionality for interoperation between the TSN network 500 and the 5G system 592. The TT function may lie on both the user plane (UPF/TT) 540 and the control plane (AF/TT) 570. The 5G system specific procedures within the 5G core system and the RAN, the wireless communication links, etc. remain hidden from the TSN network 500. To achieve such transparency of the 5G system 592 to the TSN network 500, the 5G system 592 provides TSN ingress and egress ports via the TT functionality at the UE side and via the TT functionality (for both the user plane or the control plane) at the 5G core side towards the TSN network 500.

Figure 6:
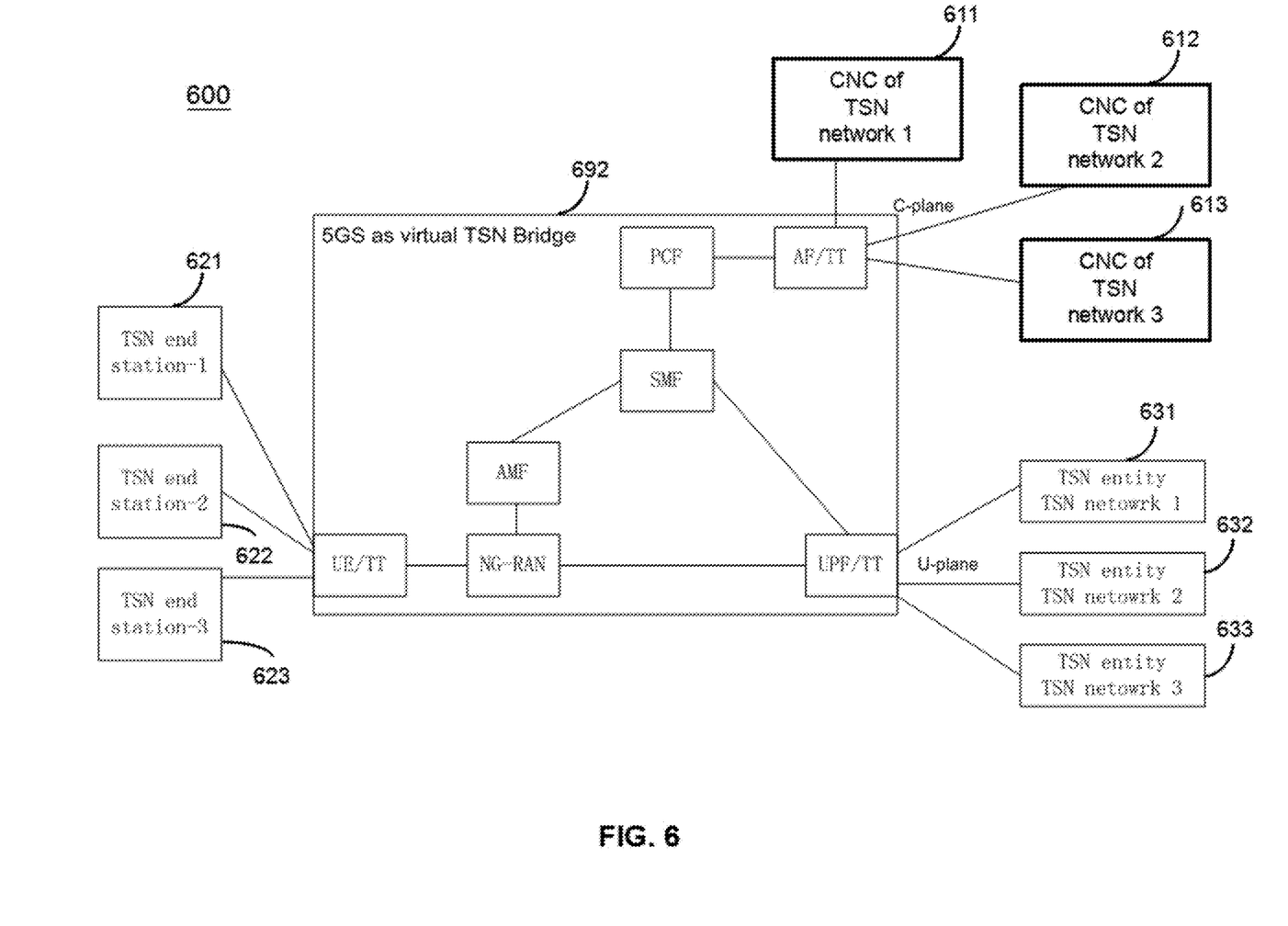
FIG. 6 illustrates an exemplary diagram for a wireless system to serve as a virtual bridge for a plurality of TSN networks, in accordance with an embodiment of the present disclosure.

FIG. 6 illustrates an exemplary diagram for a wireless system 692 to serve as a virtual bridge for a plurality of TSN networks 600, in accordance with an embodiment of the present disclosure. As shown in FIG. 6, three TSN networks 600 include TSN end stations 621, 622, 623, a TSN bridge 692, TSN entities 631, 632, 633, and CNCs 611, 612, 613. In this example, a 5G system 692 can simulate a TSN bridge serving the three TSN networks 600 at the same time. In one embodiment, the wireless system 692 has a structure similar to the structure of the 5G system 592. But the wireless system 692 serves multiple TSN networks at the same time. As such, for each of these TSN networks, the wireless system 692 needs to convert the TSN time information to its own 5G time information for QoS signal processing and/or radio resource control.

Figure 7:
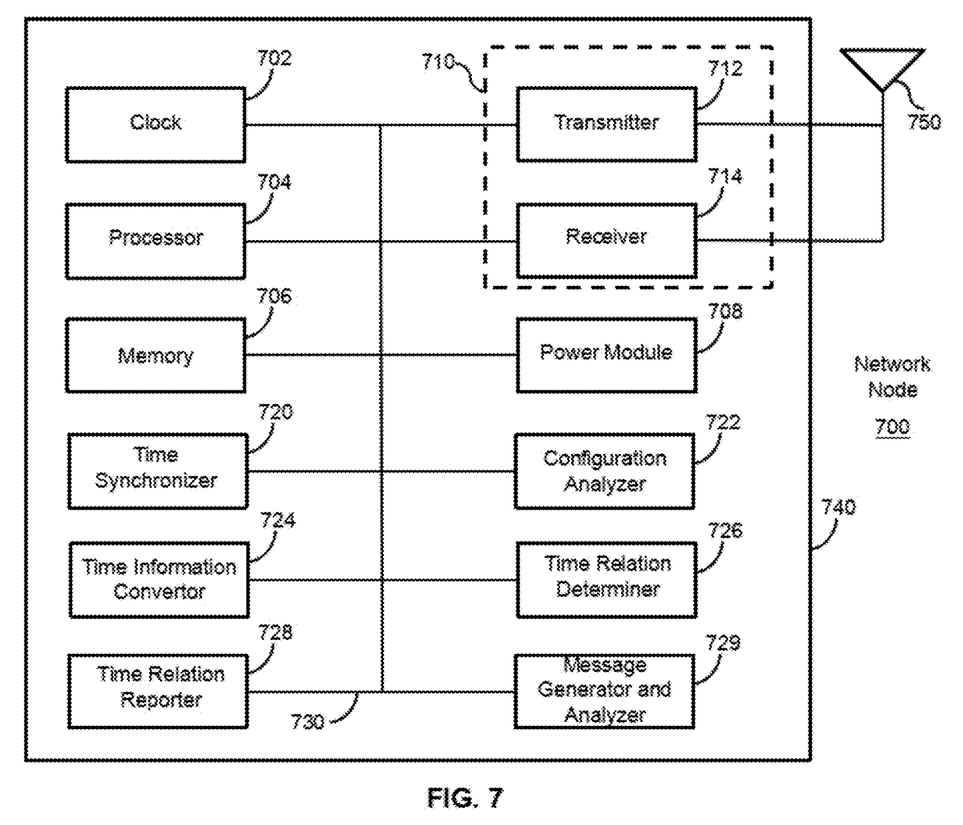
FIG. 7 illustrates a block diagram of a network node, in accordance with some embodiments of the present disclosure.

FIG. 7 illustrates a block diagram of a network node 700 of a wireless system, in accordance with some embodiments of the present disclosure. The network node 700 is an example of a network node that can be configured to implement the various methods described herein. As shown in FIG. 7, the network node 700 includes a housing 740 containing a system clock 702, a processor 704, a memory 706, a transceiver 710 comprising a transmitter 712 and receiver 714, a power module 708, a time synchronizer 720, a configuration analyzer 722, a time information convertor 724, a time relation determiner 726, a time relation reporter 728, and a message generator and analyzer 729.

In this embodiment, the system clock 702 provides the timing signals to the processor 704 for controlling the timing of all operations of the network node 700. The processor 704 controls the general operation of the network node 700 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 706, which can include both read-only memory (ROM) and random access memory (RAM), can provide instructions and data to the processor 704. A portion of the memory 706 can also include non-volatile random access memory (NVRAM). The processor 704 typically performs logical and arithmetic operations based on program instructions stored within the memory 706. The instructions (a.k.a., software) stored in the memory 706 can be executed by the processor 704 to perform the methods described herein. The processor 704 and memory 706 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 710, which includes the transmitter 712 and receiver 714, allows the network node 700 to transmit and receive data to and from a remote device (e.g., another network node or a UE). An antenna 750 is typically attached to the housing 740 and electrically coupled to the transceiver 710. In various embodiments, the network node 700 includes (not shown) multiple transmitters, multiple receivers, and multiple transceivers. In one embodiment, the antenna 750 is replaced with a multi-antenna array 750 that can form a plurality of beams each of which points in a distinct direction. The transmitter 712 can be configured to wirelessly transmit packets having different packet types or functions, such packets being generated by the processor 704. Similarly, the receiver 714 is configured to receive packets having different packet types or functions, and the processor 704 is configured to process packets of a plurality of different packet types. For example, the processor 704 can be configured to determine the type of packet and to process the packet and/or fields of the packet accordingly.

According to various embodiments, the network node 700 may be a specific network node, where each of the time synchronizer 720, the configuration analyzer 722, the time information convertor 724, the time relation determiner 726, the time relation reporter 728, and the message generator and analyzer 729 may be included, not included, or optionally included in the specific network node. In one embodiment, the network node 700 may serve as an AF that supports application functions of a wireless system. The wireless system may serve as a virtual TSN bridge for a TSN network. The network node 700 in the wireless system is a network element that has a TSN translator functionality for interoperation between the wireless system and the TSN.

In one embodiment, the network node 700 includes the time synchronizer 720 configured for performing time synchronization with a first master clock of the wireless system; and performing time synchronization with a second master clock of the TSN. The network node 700 may further include the configuration analyzer 722 configured for receiving, from a controller of the TSN, and analyzing a configuration that comprises time information of the TSN. The configuration analyzer 722 may send the time information of the TSN to the time information convertor 724 for time information conversion.

In one embodiment, the time information convertor 724 may convert the time information of the TSN to converted time information of the wireless system. For example, the time information convertor 724 may generate the converted time information of the wireless system based on the time information of the TSN and a time offset between a first time corresponding to the first master clock and a second time corresponding to the second master clock. The time information convertor 724 may then transmit, via the transmitter 712, the converted time information to a second network node of the wireless system.

In one embodiment, the second network node is a PCF including the message generator and analyzer 729 that generates a policy modification that carries the converted time information and notifies a third network node of the wireless system about the policy modification. In one embodiment, the third network node is an SMF including the message generator and analyzer 729 that generates time and quality of service (QoS) information for a fourth network node of the wireless system. In one embodiment, the fourth network node is an NG-RAN including the message generator and analyzer 729 that utilizes the time and QoS information for radio resource control regarding an air interface between the NG-RAN and a wireless communication device, e.g. a UE, in the wireless system.

In another embodiment, the network node 700 may serve as an AF which includes the configuration analyzer 722 configured for receiving, from a controller of a TSN, a configuration that comprises time information of the TSN. In this example, the configuration analyzer 722 transmits, via the transmitter 712, the time information of the TSN to a second network node, e.g. a PCF, of the wireless system.

The network node 700 may further include the time relation determiner 726 configured for determining a time relation between a first master clock of the wireless system and a second master clock of the TSN. The time relation determiner 726 may transmit, via the transmitter 712, the time relation between the first master clock and the second master clock to second network node. In one example, the transmitted time relation comprises a time offset between a first time corresponding to the first master clock and a second time corresponding to the second master clock. In another example, the transmitted time relation comprises information about: a local time of the wireless system at the first network node, and a TSN time corresponding to the local time.

The second network node may be a PCF configured for receiving the time information of the TSN and the time relation from the first network node, and converting, via the time information convertor 724 of the second network node, the time information of the TSN to converted time information of the wireless system based on the time information of the TSN and the time relation.

In one embodiment, the second network node is a PCF including the message generator and analyzer 729 that generates a policy modification that carries the converted time information and notifies a third network node of the wireless system about the policy modification. In one embodiment, the third network node is an SMF including the message generator and analyzer 729 that generates time and quality of service (QoS) information for a fourth network node of the wireless system. In one embodiment, the fourth network node is an NG-RAN including the message generator and analyzer 729 that utilizes the time and QoS information for radio resource control regarding an air interface between the NG-RAN and a wireless communication device, e.g. a UE, in the wireless system.

In a different embodiment, the network node 700 may serve as a UPF that supports user plane functions of a wireless system. The wireless system may serve as a virtual TSN bridge for a TSN network. The network node 700 in the wireless system is a network element that has a TSN translator functionality for interoperation between the wireless system and the TSN. The network node 700 may include the time synchronizer 720 configured for performing time synchronization with both a first master clock of the wireless system and a second master clock of the TSN.

Based on the time synchronization, the time relation determiner 726 of the UPF may determine a time relation between the first master clock of the wireless system and the second master clock of the TSN. In one example, the time relation comprises a time offset between a first time corresponding to the first master clock and a second time corresponding to the second master clock. In another example, the time relation comprises information about: a local time of the wireless system at the first network node, and a TSN time corresponding to the local time.

In one embodiment, the time relation reporter 728 of the UPF may report the time relation between the first master clock and the second master clock to a second network node, e.g. a PCF, of the wireless system. For example, the time relation reporter 728 of the UPF may transmit the time relation to an SMF of the wireless system. The SMF may then transmit the time relation to the PCF. The time relation may be reported during or after an establishment of a protocol data unit (PDU) session.

In one embodiment, a third network node, e.g. an AF, of the wireless system includes the configuration analyzer 722 configured for receiving time information of the TSN from a controller of the TSN, and forwarding time information of the TSN to the second network node. The second network node may be a PCF including the time information convertor 724 configured for converting the time information of the TSN to converted time information of the wireless system based on the time information of the TSN and the time relation between the first master clock and the second master clock.

In one embodiment, the second network node is a PCF including the message generator and analyzer 729 that generates a policy modification that carries the converted time information and notifies a fourth network node of the wireless system about the policy modification. In one embodiment, the fourth network node is an SMF including the message generator and analyzer 729 that generates time and quality of service (QoS) information for a fifth network node of the wireless system. In one embodiment, the fifth network node is an NG-RAN including the message generator and analyzer 729 that utilizes the time and QoS information for radio resource control regarding an air interface between the NG-RAN and a wireless communication device, e.g. a UE, in the wireless system.

In one embodiment, after receiving the time relation between the first master clock and the second master clock, the second network node is a PCF including the time relation reporter 728 configured for reporting the time relation to a third network node of the wireless system. The third network node may be an AF including the configuration analyzer 722 configured for receiving time information of the TSN from a controller of the TSN. The time information convertor 724 of the AF may convert the time information of the TSN to converted time information of the wireless system based on the time information of the TSN and the time relation; and transmit the converted time information to the second network node.

The power module 708 can include a power source such as one or more batteries, and a power regulator, to provide regulated power to each of the above-described modules in FIG. 7. In some embodiments, if the network node 700 is coupled to a dedicated external power source (e.g., a wall electrical outlet), the power module 708 can include a transformer and a power regulator.

The various modules discussed above are coupled together by a bus system 730. The bus system 730 can include a data bus and, for example, a power bus, a control signal bus, and/or a status signal bus in addition to the data bus. It is understood that the modules of the network node 700 can be operatively coupled to one another using any suitable techniques and mediums.

Although a number of separate modules or components are illustrated in FIG. 7, persons of ordinary skill in the art will understand that one or more of the modules can be combined or commonly implemented. For example, the processor 704 can implement not only the functionality described above with respect to the processor 704, but also implement the functionality described above with respect to the message generator and analyzer 729. Conversely, each of the modules illustrated in FIG. 7 can be implemented using a plurality of separate components or elements.

Figure 8:
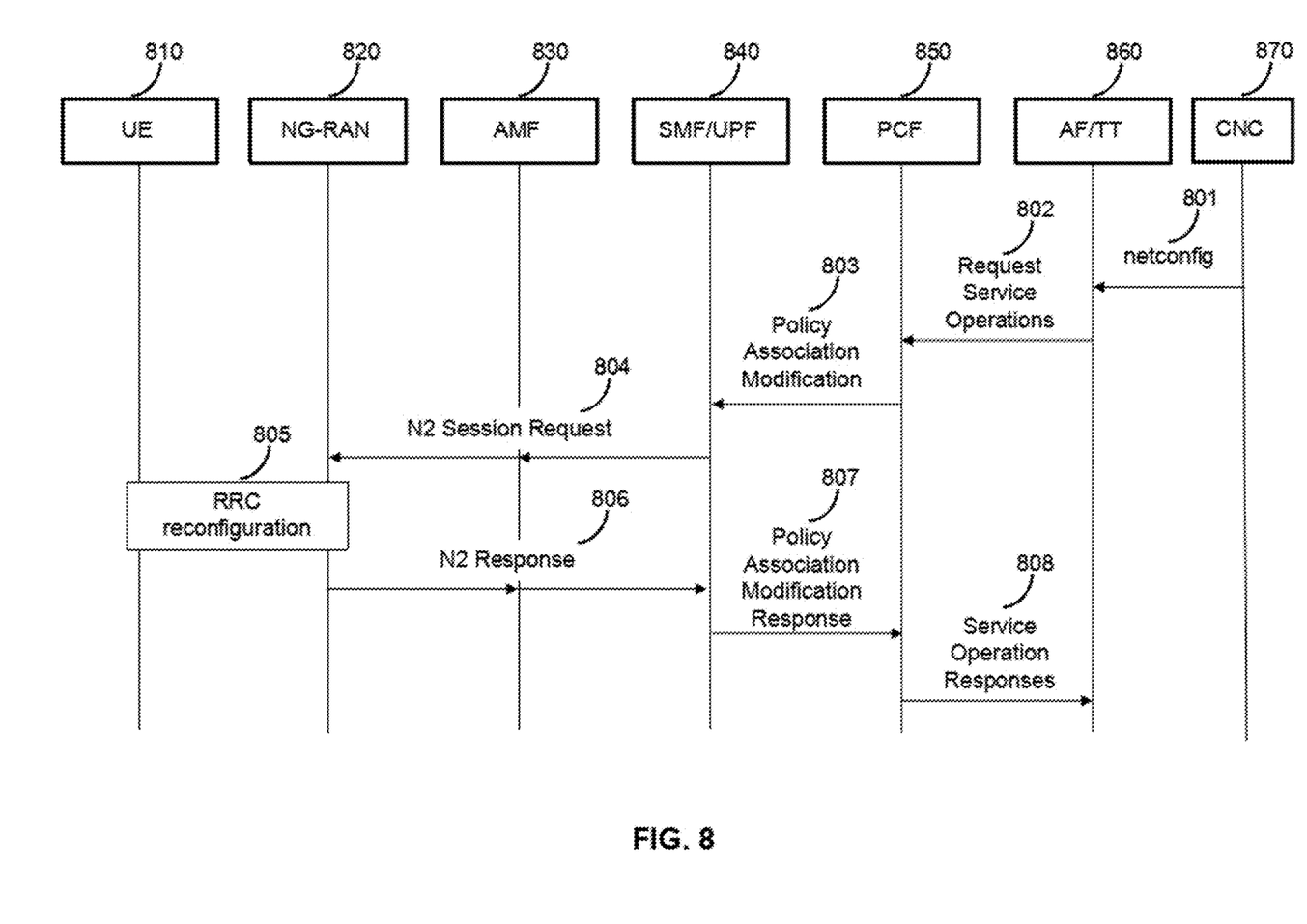
FIG. 8 illustrates an exemplary method for a wireless system to support quality of service (QoS) signaling of a TSN network, in accordance with an embodiment of the present disclosure.

FIG. 8 illustrates an exemplary method for a wireless system to support QoS signaling of a TSN network, in accordance with an embodiment of the present disclosure. At operation 801, the CNC 870 configures the 5G system TSN bridge with TSN control information. This message may be netconfig and sent to the AF/TT 860. At operation 802, the AF/TT 860 converts the TSN control information to parameters of the 5G N5 interface between AF 860 and PCF 850. The AF/TT 860 may invoke request service operations to PCF 850. For example, the AF/TT 860 may invoke the Npcf_PolicyAuthorization_Create Request Service Operation, or Npcf_PolicyAuthorization_Update Request service operation to the PCF 850. At operation 803, the PCF 850 invokes SM policy association modification to notify the SMF 840 about the modification of policies. At operation 804, the SMF 840 generates a N2 session request. In one example, the SMF 840 invokes Namf_Communication_N1N2MessageTransfer to the AMF 830. The message includes the N2 SM information, N1 SM container. The N2 SM information includes the QoS information required by the NG-RAN 820. The N1 SM container includes the session and QoS information required by the UE 810. The AMF 830 forwards the message to the NG-RAN 820.

At operation 805, the NG-RAN 820 uses the QoS information in the N2 SM information for radio resource establishment and sends the N1 SM container to the UE 810 in the radio resource control (RRC) reconfiguration. At operation 806, the NG-RAN 820 sends the N2 response to the SMF 840 via the AMF 830. At operation 807, the SMF 840 sends the SM policy association modification response to the PCF 850. At operation 808, the PCF 850 sends response(s) including the Npcf_PolicyAuthorization_Create Response and/or Npcf_PolicyAuthorization_Update Response to the AF/TT 860.

When there is a TSN traffic, FIG. 4 shows how the 5G system and the CNC work together to guarantee the QoS of the TSN traffic. Because the TSN traffic has restrict time control requirement, the NG-RAN needs the time information for radio resource access control and/or radio resource reservation.

The 5G system has its own clock domain, which means the clock in the 5G system is different from the TSN clock. In addition, the clocks in different TSN networks are also different. That is, the reference times of TSN master clocks are different between two TSN networks.

The message in operation 801 of FIG. 4 carries the TSN network time information. The time information cannot be used by the NG-RAN 820 for radio resource control, because the NG-RAN time clock is synchronized with the 5G system master clock rather than the TSN master clock. In one embodiment, all the 5G system entities, including particularly the NG-RAN 820, are time synchronized with the TSN network master clock, such that the time control information in the operation 801 can be used to calculate the time needed by the NG-RAN 820 for radio resource control. But when the 5G system supports a large number of TSN networks at the same time, this method creates a big issue of scalability and complexity. For example, if the 5G system supports 5 TSN networks, the NG-RAN 820 shall keep time synchronization with 5 master clocks in these TSN networks at the same time.

In accordance with some embodiments of the present disclosure, the AF/TT is time synchronized with both the TSN master clock and the 5G system master clock. In a first embodiment, when the AF/TT receives the configuration (e.g. netconfig) from the CNC, the AF/TT converts the TSN time information in the configuration to the 5G system clock time information. After the time synchronization with the 5G system master clock and the TSN master clock, the AF calculates a time difference between these two time domains. For example, when the time is T1 in the 5G system, the time in the TSN network is T2. Accordingly, the time offset between the 5G system and the TSN network is T2−T1. When the AF/TT receives the configuration from the CNC with TSN time information T3, the AF/TT will convert the TSN time information T3 to the 5G system time T4=T3−(T2−T1). Then the AF/TT sends the converted time information T4 to the PCF.

In a second embodiment, when the AF/TT receives the configuration (e.g. netconfig) from the CNC, the AF/TT sends the time information received from the CNC to the PCF. The AF/TT also sends the 5G system time clock information and the TSN clock information to the PCF. In one example, the AF sends the time offset between the 5G system clock and the TSN clock to the PCF. In another example, the AF can send to the PCF information about: the local 5G clock and the TSN clock corresponding to the 5G system clock at the AF/TT. The PCF may then covert the TSN time information to the 5G system time information based on what it receives from the AF/TT. In either the first embodiment or the second embodiment, the 5G system can calculate the time information to be used by the NG-RAN for radio resource control.

Figure 9:
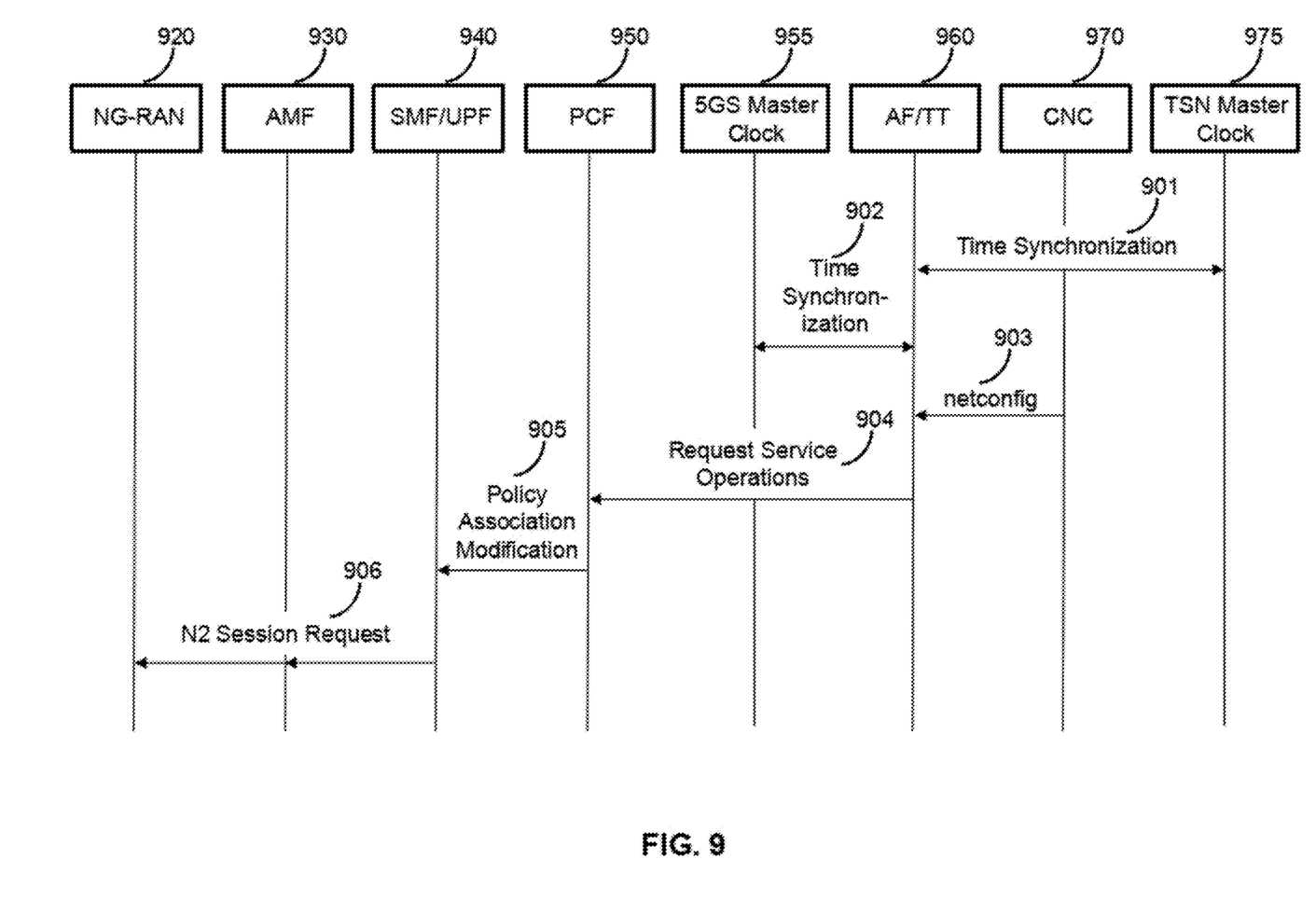
FIG. 9 illustrates an exemplary method for a wireless system to support QoS signaling of a TSN network, including a time mapping from a clock of the TSN to a clock of the wireless system, in accordance with an embodiment of the present disclosure.

FIG. 9 illustrates an exemplary method for a wireless system to support QoS signaling of a TSN network, including a time mapping from a clock of the TSN to a clock of the wireless system, in accordance with an embodiment of the present disclosure. At operation 901, the AF/TT 960 is time synchronized with the TSN master clock 975. At operation 902, the AF/TT 960 is time synchronized with the 5G system master clock 955. At operation 903, the CNC 970 configures the 5G system TSN bridge with TSN control information, e.g. by message netconfig. This message is sent to the AF/TT 960. At operation 904, the AF/TT 960 converts the TSN control information to parameters of the 5G N5 interface between the AF 960 and the PCF 950. The TSN clock time information is converted to the 5G system clock time information. Alternatively, the AF/TT 960 converts the TSN clock information to: TSN clock information+a time relation between the 5G system clock and the TSN clock. The AF/TT 960 may invoke request service operations to the PCF 950. For example, the AF/TT 960 may invoke the Npcf_PolicyAuthorization_Create Request Service Operation, or the Npcf_PolicyAuthorization_Update Request service operation to the PCF 950.

At operation 905, the PCF 950 invokes SM policy association modification to notify the SMF 940 about modification of policies. The SMF 940 can calculate the time information to be used by the NG-RAN 920. At operation 906, the SMF 940 generates a N2 session request. For example, the SMF 940 invokes Namf_Communication_N1N2MessageTransfer to the AMF 930. The message includes the N2 SM information, N1 SM container. The N2 SM information includes the QoS information required by the NG-RAN 920. The N1 SM container includes the session and QoS information required by the UE associated with the NG-RAN 920. The AMF 930 forwards the message to the NG-RAN 920. The NG-RAN 920 will use the time and QoS information in the N2 SM information for radio resource establishment and send the N1 SM container to the UE in a RRC reconfiguration.

FIG. 9 shows a time mapping from the TSN clock to the 5G system clock. In particular, FIG. 9 shows how the TSN time information is mapped to the 5G system time information. One or more new elements are to be added to the message(s) carrying the converted time information and/or the time relation between the TSN clock and the 5G clock.

In accordance with some embodiments of the present disclosure, the UPF/TT is time synchronized with both the TSN master clock and the 5G system master clock. During or after the PDU session establishment, the UPF/TT notifies the 5G core system about a time relation between the TSN clock and the 5G system clock. This information may be sent to the PCF via the SMF. The time relation between the TSN clock and the 5G system clock may be either a time offset between the 5G system clock and the TSN clock, or information about a local 5G clock and a TSN clock corresponding to the 5G local clock at the UPF. When the AF/TT receives the configuration (e.g. netconfig) from the CNC, the AF/TT forwards the TSN time information to the PCF. The PCF converts the TSN time information to the 5G system clock time information based on similar methods in the first embodiment or the second embodiment. In another embodiment, after receiving the time relation from the UPF, the PCF may forward the time relation to the AF, such that the AF will convert the TSN time information to the 5G system clock time information based on similar methods in the first embodiment or the second embodiment.

Figure 10:
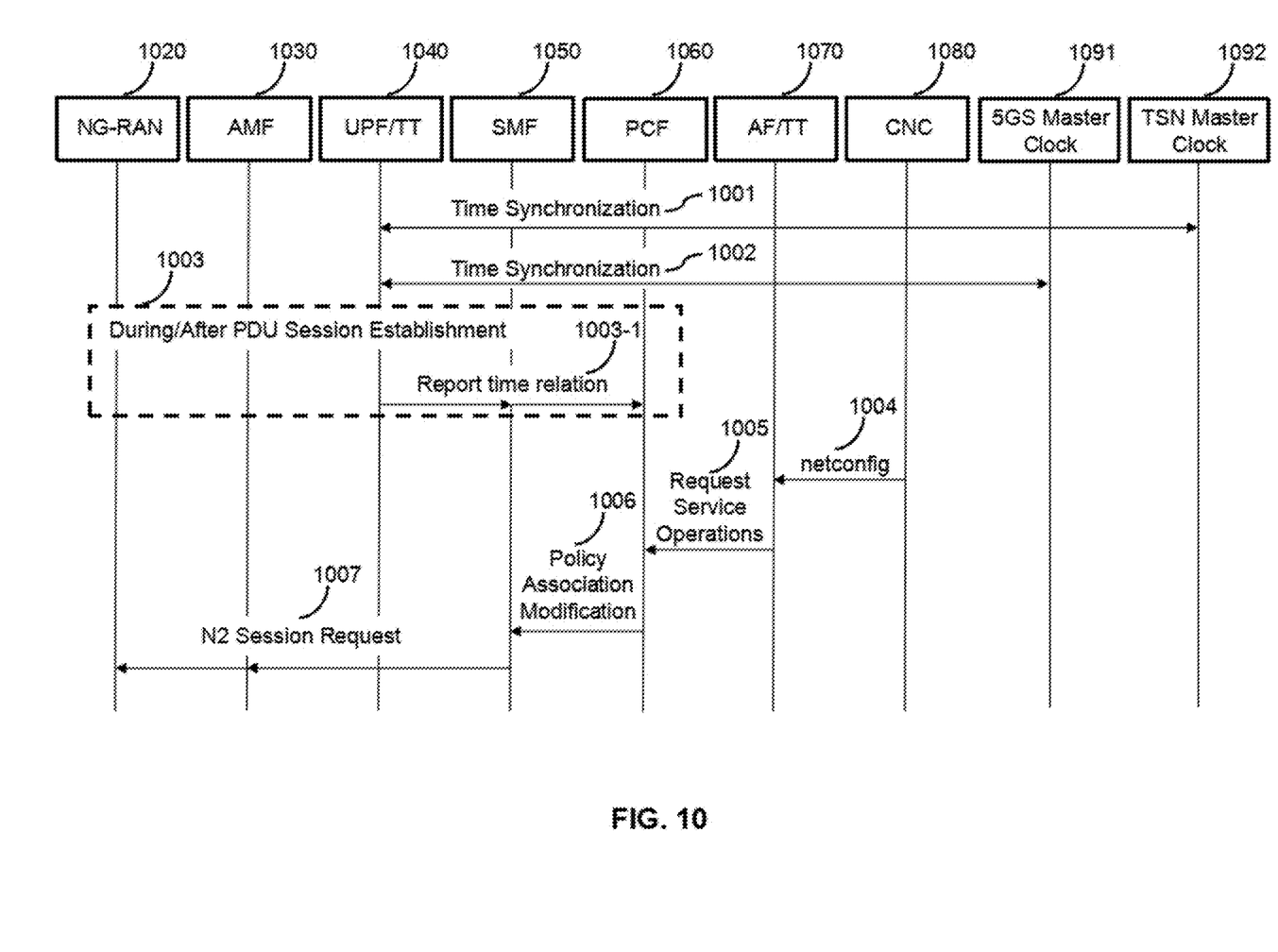
FIG. 10 illustrates another exemplary method for a wireless system to support QoS signaling of a TSN network, including a time mapping from a clock of the TSN to a clock of the wireless system, in accordance with an embodiment of the present disclosure.

FIG. 10 illustrates another exemplary method for a wireless system to support QoS signaling of a TSN network, including a time mapping from a clock of the TSN to a clock of the wireless system, in accordance with an embodiment of the present disclosure. At operation 1001, the UPF/TT 1040 is time synchronized with the TSN master clock 1092. At operation 1002, the UPF/TT 1040 is time synchronized with the 5G system master clock 1091. At operation 1003, during or after PDU session establishment procedure, the UPF/TT 1040 reports the time relation between the 5G system clock and the TSN clock to the SMF 1050, and the SMF 1050 forwards the time relation to the PCF 1060. At operation 1004, the CNC 1080 configures the 5G system TSN bridge with TSN control information, e.g. by a message netconfig. This message is sent to the AF/TT 1070. At operation 1005, the AF/TT 1070 may invoke request service operations to the PCF 1060. For example, the AF/TT 1070 forwards the TSN time control information to the PCF 1060 using the Npcf_PolicyAuthorization_Create Request Service Operation, or the Npcf_PolicyAuthorization_Update Request service operation.

At operation 1006, the PCF 1060 converts the TSN time control information to the 5G system time information according to the time relation between the TSN clock and the 5G system clock. The PCF 1060 invokes SM policy association modification to notify the SMF 1050 about the modification of policies. The SMF 1050 can calculate the time information to be used by the NG-RAN 1020. At operation 1007, the SMF 1050 generates a N2 session request. For example, the SMF 1050 invokes Namf_Communication_N1N2MessageTransfer to the AMF 1030. The message includes the N2 SM information, N1 SM container. The N2 SM information includes the QoS information required by the NG-RAN 1020. The N1 SM container includes the session and QoS information required by the UE associated with the NG-RAN 1020. The AMF 930 forwards the message to the NG-RAN 920. The NG-RAN 1020 will use the time and QoS information in the N2 SM information for radio resource establishment and send the N1 SM container to the UE in a RRC reconfiguration.

FIG. 10 shows a time mapping from the TSN clock to the 5G system clock. In particular, FIG. 10 shows how the TSN time information is mapped to the 5G system time information. One or more new elements are to be added to the message(s) carrying the converted time information and/or the time relation between the TSN clock and the 5G clock. The order of the operations shown in each of FIGS. 8-10 may be changed according to different embodiments of the present disclosure.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first network node of a wireless system, the method comprising:
   reporting, to a second network node of the wireless system, a time relation between a first master clock of the wireless system and a second master clock of a time sensitive network (TSN), wherein:
   a third network node of the wireless system is configured for receiving time information for scheduling from a controller of the TSN, and forwarding the time information to the second network node; and
   the second network node is configured for converting the time information to converted time information of the wireless system based on the time information and the time relation.

2. The method of claim 1, wherein the first network node in the wireless system is a network element that has a TSN translator functionality for interoperation between the wireless system and the TSN.

3. The method of claim 1, wherein the first network node supports user plane functions of the wireless system.

4. The method of claim 1, further comprising:
   performing time synchronization with the first master clock; and
   performing time synchronization with the second master clock.

5. The method of claim 1, wherein the time relation comprises a time offset between a first time corresponding to the first master clock and a second time corresponding to the second master clock.

6. A first network node comprising a processor, wherein the processor is configured to:
   report, via a transmitter to a second network node of the wireless system, a time relation between a first master clock of the wireless system and a second master clock of a time sensitive network (TSN), wherein:
   a third network node of the wireless system is configured for receiving time information for scheduling from a controller of the TSN, and forwarding the time information to the second network node; and
   the second network node is configured for converting the time information to converted time information of the wireless system based on the time information and the time relation.

7. The first network node of claim 6, wherein the first network node in the wireless system is a network element that has a TSN translator functionality for interoperation between the wireless system and the TSN.

8. The first network node of claim 6, wherein the processor is further configured to support user plane functions of the wireless system.

9. The first network node of claim 6, wherein the processor is further configured to:
   perform time synchronization with the first master clock; and
   perform time synchronization with the second master clock.

10. The first network node of claim 6, wherein the time relation comprises a time offset between a first time corresponding to the first master clock and a second time corresponding to the second master clock.

* * * * *